Patented Feb. 28, 1950

2,498,658

UNITED STATES PATENT OFFICE 2,498,658

PROCESSES FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application May 29, 1948, Serial No. 30,188

5 Claims. (Cl. 252—342)

This invention relates to processes or procedures particularly adapted for preventing, breaking, or resolving emulsions of the water-in-oil type, and particularly, petroleum emulsions. This application is a continuation-in-part of our co-pending application Serial No. 666,819, filed May 2, 1946, now abandoned. See our co-pending application Serial No. 8,731, filed February 16, 1948.

Complementary to the above aspect of our invention is our companion invention concerned with the new chemical products or compounds used as the demulsifying agents in said aforementioned processes or procedures, as well as the application of such chemical compounds, products, and the like, in various other arts and industries, along with methods for manufacturing said new chemical products, or compounds which are of outstanding value in demulsification. See our co-pending application Serial No. 30,186, filed May 29, 1948.

Our invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

Briefly stated, the new chemical compounds herein contemplated as demulsifying agents, are derived by oxyalkylation of derivatives obtained by the oxyethylation of certain acidic fractional esters of triricinolein. Such acidic esters are obtained by reacting triricinolein with one to three moles of polycarboxy acid, and particularly a dicarboxy acid, such as phthalic acid, adipic acid, diglycollic acid, etc. The hereto appended claims are limited to derivatives of dicarboxy acids or anhydrides.

Acidic esters of triricinolein can be manufactured in two different ways, although using the same general procedure. One method is to use a temperature not in excess of 210° and in absence of any catalyst. Under such circumstances, one forms the expected esters in which the dicarboxy acid radical is invariably attached to the ricinoleyl hydroxyl. The second procedure involves the use of temperatures higher than 210° C. in the presence or absence of catalysts, so that a certain amount of rearrangement may take place with the result that the dicarboxy acid radical may be attached to the glyceryl radical and not limited to attachment to the ricinoleyl radical. This latter type of structure will be clarified by subsequent description. It is to be noted, however, that the compounds contemplated herein are those obtained from intermediates in which the dicarboxy acid radical is attached to the ricinoleyl radical, and thus excludes acidic esters obtained by rearrangement at higher temperatures or in presence of catalysts.

The manufacture of fractional esters of triricinolein is well known and described in numerous patents. The literature including various patents also describes the esterification of such fractional esters with polyhydric alcohols including polyglycols under various conditions involving, for example, either the presence or absence of catalysts, or a variety of catalysts, including both acid and basic catalysts.

It has been suggested that the reaction of a fractional ester with a polyethylene glycol under various conditions, would, in essence, result in a product substantially the same as that obtained by reacting with ethylene oxide so as to obtain the same stoichiometric relationship. We have found that this is not the case and that the resultant products are significantly different in composition, and those products obtained by oxyethylation are much more effective, for a number of purposes, such as, for example, demulsification of petroleum emulsions, break inducers, in the doctor treatment of sour hydrocarbons, etc.

Since this difference in composition involves the inherent nature of the reactants and resultants, it is deemed desirable to point out clearly the nature of the product obtained, when triricinolein is reacted with polycarboxy acids, and particularly those having 4 to 10 carbon atoms, and particularly dicarboxy acids having 4 to 8 carbon atoms, such as succinic acid, adipic acid, diglycollic acid and phthalic acid. The anhydrides, of course, are the obvious equivalent of the acid and include, among others, phthalic anhydride, maleic anhydride, citraconic anhydride, etc. Other suitable acids include maleic, fumaric, oxalic, tricarballic, tartaric, azelaic, sebacic, etc. Other acids include cisΔ⁴-tetrahydrophthalic anhydride obtained by the action of butadiene on maleic anhydride, and 3,6-endomethyleneΔ⁴-tetrahydrophthalic anhydride obtained by the action of cyclopentadiene on maleic anhydride. It is to be noted that none of these acids have more than 10 carbon atoms. As stated, it is understood that the acids and anhydrides are considered as equivalents.

A preferred ester product may be obtained by esterification reaction between triricinolein and a dibasic carboxylic acid, such as phthalic acid. Ricinoleic acid may be indicated by the following formula:

$$CH_3(CH_2)_5\overset{OH}{\underset{|}{C}}H.CH_2.CH=CH(CH_2)_7.COOH$$

which may be conveniently abbreviated for many purposes to

HORCOOH

Employing HORCOO as the acyloxy group of ricinoleic acid, triricinolein may be represented by the formula

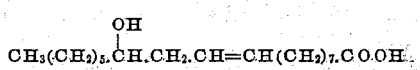

and contains the residue of the polyhydric alcohol glycerol, which may be represented as

Triricinolein readily esterifies with phthalic acid, and if three moles of phthalic anhydride or acid are caused to react with one mole of triricinolein, a fractional acidic ester will be obtained according to the following reaction:

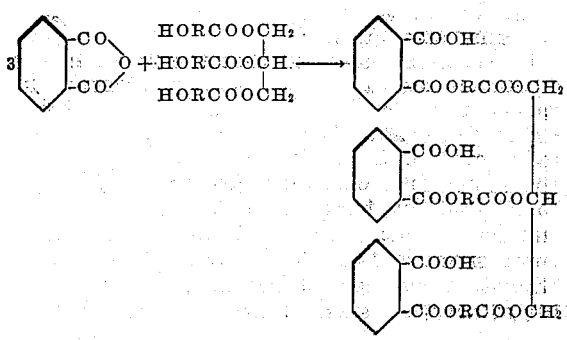

It is not necessary to use three moles of phthalic anhydride per mole of triricinolein, and if desired, one may use one or two moles, although the preference is to use approximately 2 to 2½ or 3 moles.

Likewise, in carrying on the esterification reactions broadly, without limitation to the particular type herein employed as intermediates, it is not essential that a carboxylic group of the dibasic carboxylic acid react with the alcoholiform hydroxyl in the ricinoleyl radical while the ricinoleyl radical remains directly connected with the polyhydric alcohol radical. One might react ricinoleic acid monophthalate, obtained by reaction between ricinoleic acid and phthalic anhydride, mole for mole, with glycerol, in the ratio of three moles of the fractional ester for one mole of glycerol. This would yield a mixture of compounds such as the following:

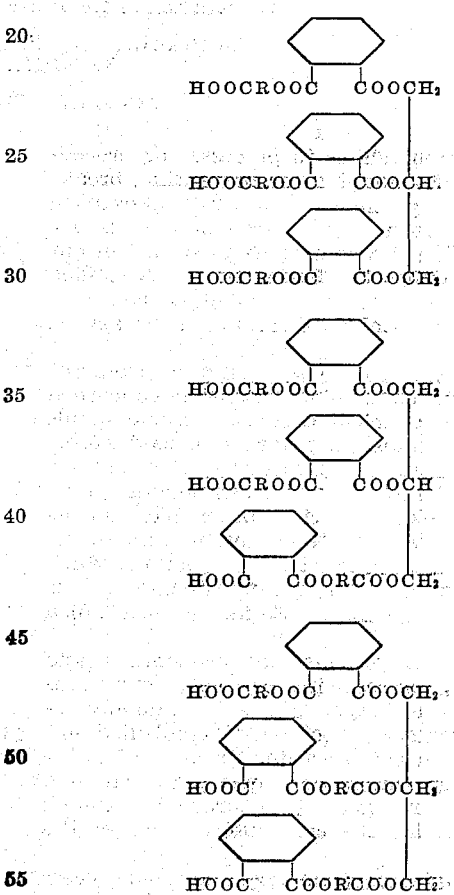

Not only may compounds of the above type be obtained by the procedure previously described, but such compounds may occur to a greater or lesser degree as the result of molecular rearrangement in the production of acidic fractional esters from triricinolein and various polycarboxy acids, as previously mentioned, provided one employs temperatures in excess of 210° C. or employs catalysts, or both.

In carrying on the esterification reaction, there may develop cross-linkages either through the polyhydric alcohol, or through the polybasic carboxylic acid, due to the polyfunctionality of these materials. For example, in an esterification reaction between triricinolein and phthalic acid, the resulting product may comprise more complex molecules, such as the following, which illustrates cross-linkage through the polyhydric alcohol residue.

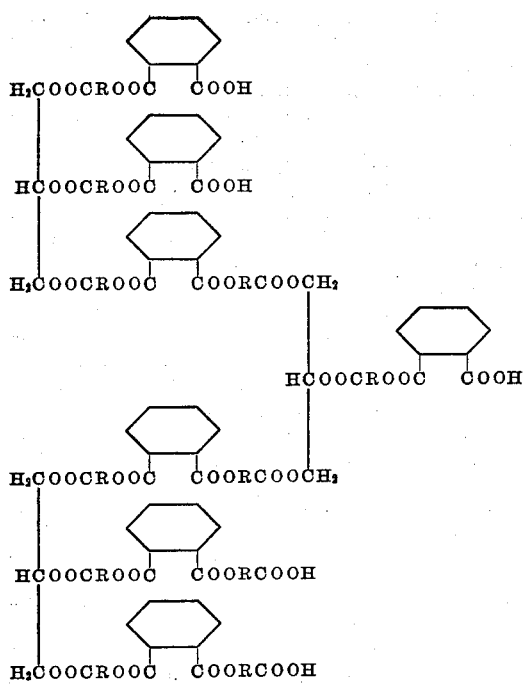

Cross linkage, likewise, may occur through the polybasic carboxy acid to afford molecular structure such as

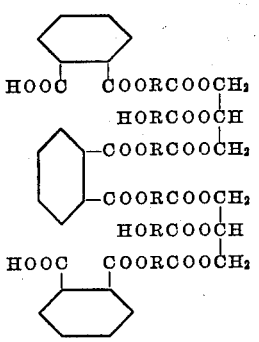

It is apparent that other cross linkages may occur. Such ester products containing more complex molecules are also suitable. It is also apparent that there may be great variations in the molecular weight of the product. The molecular weight of the ester product, as determined by cryoscopic methods, or from obvious composition of the ester, usually runs between about 300 and about 4,000 and is seldom over 6,000. Ester products having a molecular weight over about 10,000 preferably are not employed. During the esterification reaction there may be some polymerization and polymerized products, as well as simple monomers, may be used.

Attention is directed to what has been said previously for the sake of clarification and that is that the intermediates herein contemplated, i. e., the acidic esters derived by reaction between triricinolein and various dicarboxy acids or anhydrides, are limited to those obtained by manufacture under conditions which preclude drastic rearrangements, and thus are characterized by the fact that the dicarboxy acid radical is attached directly to the ricinoleyl radical and not to the glyceryl radical.

Tricarboxy acids may be employed as reactants in the same manner as dicarboxy acids. However, it is obvious, in light of what is said subsequently, that if a tricarboxy acid is used, subsequent oxyethylation results in a branched chain or two chains of polyglycol radicals instead of one. In other words, if a dicarboxy acid, such as phthalic acid, is employed, there is a single carboxyl radical available for oxyethylation. If, on the other hand, tricarballylic acid is employed, then there may be, and in most instances there happens to be, two carboxyls available for oxyethylation, thus resulting in either a branched chain or two separate polyglycol radicals. Actually, the configuration so produced from a structural standpoint, closely approximates that obtained by treating a sole carboxyl radical remaining from phthalic acid with glycide or glycerol and then oxyethylating such ester so as to obtain a branched chain polyglycol or two separate polyglycol radicals. Since this type of compound is contemplated in our co-pending application Serial No. 30,187, filed May 29, 1948, it will be noted that the specific examples herein included and the claims themselves are directed to derivatives of dicarboxy acids.

TRIRICINOLEIN ACIDIC FRACTIONAL ESTERS

*Example 1*

One pound mole of triricinolein (in the form of castor oil which ordinarily contains approximately 85% to 95% triricinolein) is reacted with 2½ pound moles of phthalic anhydride to produce a mixture of acid phthalates consisting essentially of triricinolein dibasic phthalate and triricinolein tribasic phthalate. The reaction may be caused to occur by heating the mixed materials at a temperature of approximately 120° to 140° C. for approximately 6 to 12 hours. The action can be followed roughly by withdrawing a small sample of the partially reacted mass and permitting it to cool on a watch crystal. When the reaction has become completed no crystals of phthalic anhydride appear. When the sample no longer shows the presence of such crystals on cooling, it can be titrated with a standard volumetric alkaline solution, since the acid which remains is due entirely to carboxylic hydrogen in the fractional ester and not to any unreacted phthalic anhydride. If care is taken not to use too high temperatures which would cause formation of heterocyclic bodies of the character above referred to, one can depend upon the standard alkaline solution to indicate the disappearance of the phthalic anhydride. It is not to be inferred, however, that any cyclic bodies, if formed, would be unsuitable.

The product thus obtained, however, seems to consist largely of triricinolein dibasic phthalate and triricinolein tribasic phthalate. Apparently there is no evidence of rearrangement there. This fact is indicated by a molecular weight determination, and also based on the acid value, which usually runs from a little over 100 to slightly less than 110.

TRIRICINOLEIN ACIDIC FRACTIONAL ESTERS

*Example 2*

Maleic acid or anhydride is substituted for phthalic anhydride in preceding Example 1 to give the corresponding maleic acid derivative, i. e., triricinolein dibasic maleate and triricinolein tribasic maleate.

TRIRICINOLEIN ACIDIC FRACTIONAL ESTERS

Example 3

Adipic acid or anhydride is substituted for phthalic anhydride in preceding Example 1 to give the corresponding adipic acid derivative, i. e., triricinolein dibasic adipate and triricinolein tribasic adipate.

TRIRICINOLEIN ACIDIC FRACTIONAL ESTERS

Example 4

Succinic acid or anhydride is substituted for phthalic anhydride, in preceding Example 1, to give the corresponding succinic acid derivative, i. e., triricinolein dibasic succinate and triricinolein tribasic succinate.

TRIRICINOLEIN ACIDIC FRACTIONAL ESTERS

Example 5

Diglycollic acid is substituted for phthalic anhydride, in preceding Example 1, to give the corresponding diglycollic acid derivative, i. e., triricinolein dibasic diglycollate and triricinolein tribasic diglycollate.

The products of esterification produced according to Examples 1 to 5 are viscous, yellowish or amber-colored, oily or sub-resinous materials resembling somewhat blown castor oil in consistency, and water-insoluble.

It is to be noted that the triricinolein acidic fractional esters herein contemplated as the preferred reactants are characterized by the fact that they are obtained by esterification reactions involving the use of at least one mole of the dicarboxy acid per mole of triricinolein. For instance, previous formulae indicate combinations wherein 1½ moles to 3 moles of phthalic anhydride are used per mole of triricinolein. In all instances, regardless of the ratio of dicarboxy reactant to triricinolein, there must be at least one free carboxyl per mole of triricinolein in the finished product. Such requirement is met, of course, by triricinolein monobasic phthalate, derived from one mole of triricinolein and one mole of phthalic anhydride. Attention is also directed to the fact that all the fractional esters are prepared in such a manner that the final product is anhydrous. The next step is the obvious one of subjecting such anhydrous ester to the action of ethylene oxide.

If one examines the formula for ricinoleic acid, it becomes obvious that the dicarboxy acid, such as phthalic acid, becomes attached approximately half-way in the carbon atom chain, and thus oxyethylation attacking any residual carboxyl group which is part of the dicarboxy acid radical, must, of necessity, cause the hydrophile polyglycol group to enter or make its effectiveness felt half-way in the carbon atom chain, as differentiated with the introduction of a hydrophile group at the end of a carbon atom chain. For instance, when a high molal alcohol or a high molal acid is subjected to oxyethylation, obviously such hydrophile effect is produced terminally and not at a mid-point. In this connection it is interesting to note that oxyethylation does not, as was one time believed, attack the secondary alcohol of triricinolein when castor oil is subjected to oxyethylation. For this reason, oxyethylation of the fractional esters give a product having a hydrophobe-hydrophile balance, which is entirely different from that obtained from a number of apparently kindred products. Generically speaking, oxyethylation is conducted in substantially the same manner as applied to a number of other products, in which the ethylene oxide group is introduced between an oxygen atom and a hydrogen atom, as, for example, in oxyethylation of high molal acids or high molal alcohols, substituted phenols, etc. Usually, a small amount of alkaline catalyst is added, such as one-tenth of 1% to 1% of caustic soda, sodium stearate, sodium methylate, or the like. Oxyethylation is conducted with constant stirring and a gauge pressure of 100 to 200 pounds per square inch is generally satisfactory. The temperature of reaction may be varied from 100° C. to less than 200° C. If desired, an inert solvent may be present, such as xylene, tetralin, cymene, decalin, or the like. The ethylene oxide may be used continuously, provided the addition is regulated so that it is used up more or less uniformly as it enters the reaction vessel or autoclave. Our preference, however, is to add the material batchwise, as indicated, and continue oxyethylation not only until the product is distinctly hydrophile, by until it gives a substantially clear solution in water. As to other oxyethylating procedure, attention is directed to the following United States patents and to the following British patent: U. S. Pat. Nos. 2,142,007, dated December 27, 1938, to P. Schlack; 1,845,198, February 16, 1932, O. Schmidt et al.; 1,922,459, August 12, 1933, O. Schmidt et al.; British 302,041, August 7, 1928, Jas. Y. Johnson.

WATER-SOLUBLE OXYETHYLATED TRIRICINOLEIN ACIDIC FRACTIONAL ESTER

Example 1

650 pounds of triricinolein acidic fractional ester manufactured as described under the heading Example 1, preceding, is mixed with one-half pound of sodium methylate and then reacted with approximately 161 pounds of ethylene oxide in three batches of 53.7 pounds each. The maximum pressure during the reaction was 120 pounds per square inch gauge pressure. The time of reaction required for each batch was three to five hours. The temperature employed was approximately 130° C. The material was tested for water solubility, after the addition of 161 pounds of ethylene oxide, and found to be water-insoluble. If the theoretical molecular weight of triricinolein tribasic phthalate is considered as 1450, then the average molecular weight of the raw material employed was taken as 1300. On this basis, the amount of ethylene oxide added at this point represented a molal ratio of 1 to 7.3, approximately.

Oxyethylation was then continued by the addition of three more portions of approximately 60 pounds each, so that at the end of the sixth batch, the molecular ratio had more than doubled and was approximately 1 to 18.0. The product at this point began to show some distinctly hydrophile character and solubility, but was reacted further with five additional portions of approximately 65 pounds each. Thus, the total amount of ethylene oxide added represented 161 pounds, plus 180 pounds, plus 325 pounds, being a total of 666 pounds of ethylene oxide added to 650 pounds of the original resin. On a weight basis, this represented slightly in excess of 1 to 1, and on a molal basis, it represented approximately 30 to 32 moles of ethylene oxide per mole of monomeric fractional ester. The resultant product was a thin, deep amber-colored oil, water-soluble, having a clear appearance in solution and some foaming properties.

The product so obtained consists principally of oxyethylated triricinolein dibasic phthalate and oxyethylated triricinolein tribasic phthalate. The composition of these two compounds may be shown in the following manner:

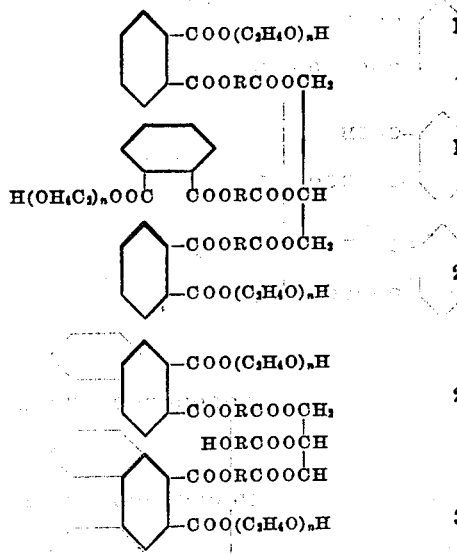

In the above formulae the value of $n$ varies on the average from 10 or 11 in the case of the tribasic derivative to 12 or 13 for the dibasic product. The acid value of this product is substantially nil, generally running about 1 to 2 at the most. This material is further identified as L-12866.

WATER-SOLUBLE OXYETHYLATED TRIRICINOLEIN ACIDIC FRACTIONAL ESTER

Example 2

The same procedure is followed as in Example 1, immediately preceding, except that triricinolein acidic fractional esters, Examples 2 to 5, inclusive, are substituted for triricinolein acidic fractional ester, Example 1. In each instance, ethylene oxide is added in the same molecular proportion, i. e., approximately 30 to 32 moles of ethylene oxide per mole per mixture averaging about 2½ moles of dicarboxy acid per mole of triricinolein. In all instances, the molecular weight is figured, based on the theoretical combination of the dicarboxy reactant and triricinolein without the loss of any water in the case of the anhydride and with the loss of only one molecule of water per molecule of dicarboxy acid, in the event an acid reactant such as diglycollic acid or adipic acid is used instead of an anhydride. However, the proportions, by weight, may be employed just as satisfactorily, i. e., adding enough ethylene oxide so that it is approximately equal in weight of the acidic ester.

WATER-SOLUBLE OXYETHYLATED TRIRICINOLEIN ACIDIC FRACTIONAL ESTER

Example 3

The same procedure is followed as in Examples 1 and 2, preceding, except that the amount of ethylene oxide added was decreased per batch, so that the total amount is equal to approximately 24 moles, instead of 32 moles, and is equal in weight to approximately 75% of the original resin, instead of 100%. These products showed reduced solubility, and were just barely soluble enough.

WATER-SOLUBLE OXYETHYLATED TRIRICINOLEIN ACIDIC FRACTIONAL ESTER

Example 4

The same procedure is followed as in Examples 1 and 2, preceding, except that the amount of ethylene oxide added was increased per batch, so that the total amount is equal to approximately 40 moles, instead of 24 or 32 moles and is equal in weight to approximately 125% of the original resin, instead of 100%. These materials showed enhanced solubility, giving absolutely clear solutions in water and showing strong foaming effects.

The preceding products have been described as oxyethylated derivatives of triricinolein acidic fractional esters. Ethylene oxide enters a hydroxyl between the oxygen atom and hydrogen atom, whether the hydroxyl be a carboxylic hydroxyl or an alcoholic hydroxyl, as shown by the previous examples, where a carboxyl radical is converted first into a glycol ester and then subsequently into a polyglycol ester. This means, of course, that if the triricinolein acidic fractional esters had been reacted with ethylene oxide or propylene oxide or butylene oxide, mole for mole, so as to give a hydroxylated ester instead of an acidic ester, such hydroxylated ester would be just as susceptible to oxyethylation as the acidic ester. In other words, an intermediate step in the previously described reactions represent compounds exemplified by the following:

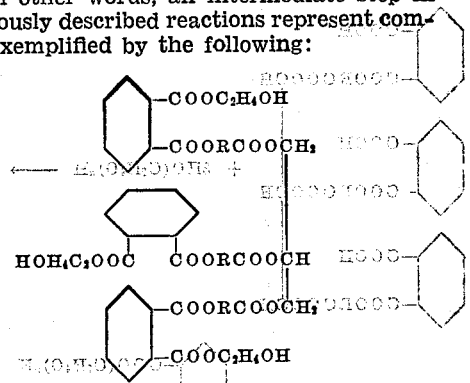

Compounds of the above type could also be obtained by esterifying the free carboxyls with a glycol such as ethylene glycol, propylene glycol, etc. It is understood, however, that this particular specification does not include those types wherein such glycols would be replaced by polyhydric alcohols having a larger number of hydroxyl groups per molecule, i. e., does not include glycerol diglycerol, triglycerol, etc. Furthermore, the compounds herein contemplated are derived solely from triricinolein and do not include compounds derived from monoricinolein, diricinolein, or any other type of fractional ester where the number of ricinoleic acid radicals is less than the valency of the polyhydric alcohol (the glyceryl radical) to which they are attached. Valency of the radical in such circumstances is measured by the number of available hydroxyl groups, that is, the valency of a glyceryl radical being considered as 3. The reason for this difference is perfectly obvious, in that an available glyceryl hydroxyl radical, as in the case of a derivative of monoricinolein or diricinolein, provides an additional point of reaction for a polybasic acid, such as phthalic anhydride, or if not so reacted upon, provides a point of reaction for ethylene oxide. Similarly, if the acidic esters are esterified with glycide or methylglycide instead of ethylene oxide or the like, or glycerol for that matter, then such esters are capable of attack by ethylene oxide so as to provide a branched chain, rather than a single chain involving polyglycol radicals. What has been said herein immediately preceding is intended to define the herein contemplated compounds with greater clarity and also to point out the line of demarcation between these particular compounds and those contemplated in our co-pending application Serial No. 666,820, filed May 2, 1946.

Products of value as demulsifying agents have been prepared by reacting triricinolein phthalates of the kind described under the heading "Triricinolein acidic fractional esters" with polyhydric alcohols, although not necessarily with polyethylene glycols having a large number of repetitious ether linkages in such proportion and manner as to render such fractional esters watersoluble or water-miscible. At first casual examination it would appear that if one were to react the acid phthalates, as exemplified by "Triricinolein acidic fractional ester, Example 1" with polyethyleneglycol representing approximately 10 or 12 ethylene oxide units, there should be obtained a product approximately identical with the product described under the heading "Watersoluble oxyethylated triricinolein acidic fractional ester, Example 1." For instance, the reaction may be indicated in the following manner:

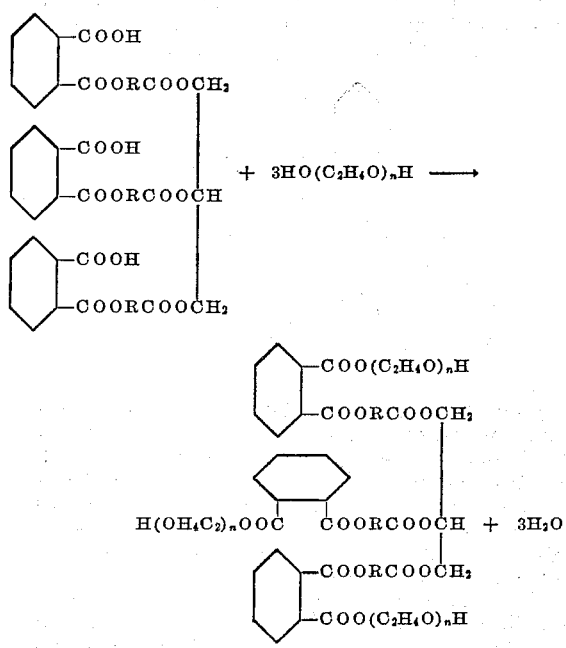

The above reaction emphasizes this very important feature, that if an attempt is made to obtain similar products by reaction with a polyethyleneglycol, then water results from the reaction and cognizance must be taken of the fact. Thus, if the reaction is conducted in the presence of water, whereas, oxyethylation is conducted under anhydrous conditions, then one must bear in mind that the water formed may become a reactant before elimination. Hence, it is obvious that the course of reaction may be changed.

Another course of difference in the reaction involving ethylene oxide, on the one hand, and a polyethyleneglycol on the other, is this particular situation; the esters employed are polyfunctional, having, for example, preferably two or more carboxyls per original molecule of triricinolein. The polyethyleneglycols are difunctional. Thus, when reacted together, there is a tendency to form a sub-resinous polyester by reactions involving simultaneously one mole of a polyethylene glycol and two carboxyls, which are part of the same molecules or much more probable parts of two different molecules.

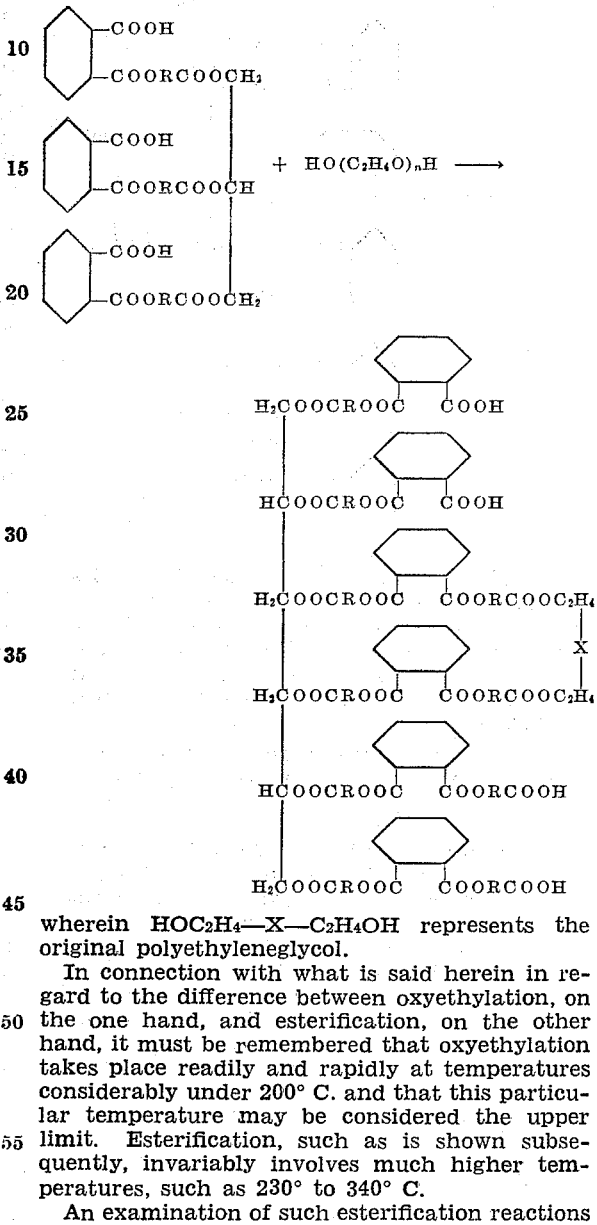

wherein $HOC_2H_4-X-C_2H_4OH$ represents the original polyethyleneglycol.

In connection with what is said herein in regard to the difference between oxyethylation, on the one hand, and esterification, on the other hand, it must be remembered that oxyethylation takes place readily and rapidly at temperatures considerably under 200° C. and that this particular temperature may be considered the upper limit. Esterification, such as is shown subsequently, invariably involves much higher temperatures, such as 230° to 340° C.

An examination of such esterification reactions are best conducted on a laboratory scale. In other words, if one were to start with approximately 650 grams of the mixture described under the heading "Triricinolein fractional ester, Example 1" having an acid value of approximately 105, and add thereto the equivalent of 2½ moles of a polyethyleneglycol having approximately 10 to 11 structural units on completion of reaction, one would anticipate that there would be a drop in acid value to approximately zero, corresponding to the acid value of the product described under the heading "Water-soluble oxyethylated triricinolein fractional ester," along with the elimination of a stoichiometrical amount of water which would be equivalent to 2½ moles or 17½ grams.

Such reaction can be conducted in any one of three ways: (a) Absence of a catalyst; (b) presence of an acid catalyst, or (c) presence of a basic catalyst. Actually, there is little or no justification for using a basic catalyst, for the reason that under such circumstances one would not expect to obtain a product comparable to that described under the heading "Water-soluble oxyethylated triricinolein fractional ester, Example 1," but would expect to get a product in which a large degree of glycerol had been replaced by the nonaethyleneglycol with subsequent corresponding reaction. In other words, one would expect trans-esterification, which is sometimes referred to as ester-interchange or alcoholysis. (See Organic Chemistry, Fieser & Fieser, 1944, page 182; and Organic Chemistry, Fuson & Snyder, 1942, page 92.)

In conducting these exploratory experiments, it becomes obvious that the two end points did not coincide, i. e., the elimination of the theoretical amount of water of reaction and reduction of the acidity to the value of 1 or 2. In each instance, an attempt was made to carry the reaction to the end point indicated in both ways. In the case of the acid catalyst ½% of paratoluene sulfonic acid was added. In connection with the polyethyleneglycol reactant attention is directed to the article entitled "Technology of the Polyethyleneglycols and Carbowax Compounds" (Chemical and Engineering News, volume 23, No. 3, page 247 (1945)). Such article points out, among other things, why the value of $n$, as herein contemplated, represents an average value, rather than an absolutely definite value of one single compound. The result of these experiments are indicated in the following table:

water which would be expected to be eliminated in experiments A, B and C so as to give a product identical with that previously referred to as Example 1, would be 17½ grams of water. Actually, when 17½ grams of water had been eliminated in all three cases, the acid value varied from approximately 20 to approximately 33. On the other hand, when the minimum acid value was obtained, even though it did not approach the amount of 2, there was a great deal more water eliminated than theory; varying from 54, in one instance, to 346 in the other. Furthermore, in order to obtain the result indicated, instead of using a temperature of approximately 130° C., or somewhat higher, but in any event, under 200° C., the temperature actually varied from 230° C. to 340° C. Attention is directed to a very significant fact, that is, that these temperatures employed in experiments A. B and C, as previously noted, vary from 230° C. to 340° C. and are within the range which produces rearrangement in the manufacture of acidic esters, as previously noted. In other words, at such temperature range, even though no catalysts were added, one would expect rearrangements, whereby, at least to a substantial extent, there would be present compounds in which the dicarboxy acid radical would be directly attached to the glyceryl radical. It is to be noted that this type of material is specifically excluded in the hereto appended claims.

In light of what has been said as to the nature of the reactions taking place and as to the results obtained in the above experiments, it is perfectly obvious that there is a very marked difference in the nature of the products obtained, depending upon whether an acidic fractional

|  | Experiment A L–24142 | Experiment B L–24143 | Experiment C L–24144 |
|---|---|---|---|
| Triricinolein Fractional Ester, Ex. 1. | 650 grams—Acid v.=105 | 650 grams—Acid v.=105 | 650 grams—Acid v.=105. |
| HO(C₂H₄O)ₙH n=10 or 11 | 700 grams | 700 grams | 700 grams. |
| Catalyst | None | ½% Toluene Sulfonic Acid | ½% Sodium Methylate. |
| Acid Value of Mixture | 50.5 | 52.0 | 50.2. |
| Conditions to bring acid value to about 2. | Could not get below 14 | Could not get below 15.6 | 4 hours at 325° C. 7.85 acid value. |
| Time | 3 hours | 4 hours | 4 hours. |
| Maximum Temperature | 340° C | 300° C | 325° C. |
| At this point H₂O eliminated | 66.8 cc. H₂O and 53.4 cc. oil | 346 cc | 54 cc. H₂O and 15 cc. oil. |
| Remarks |  | Acid value rose on further heating. | Acid value rose on further heating. |
| Conditions to bring about elimination of 17½ gr. water (theoretical). |  |  |  |
| Time | 40 min | 25 min | ¾ hr. |
| Maximum Temperature | 280° C | 230° C | 285° C. |
| Acid value at this point | 32.8 | 36.6 | 20.4. |
| Remarks | Clear oil; cloudy solution with water. | Clear oil; cloudy solution with water. | Clear oil; cloudy solution with water. |

In comparison with experiments A, B and C, it has been pointed out previously in "Oxyethylated water-soluble triricinolein acidic fractional ester, Example 1" that such reactant as was used in experiments A, B and C can be treated with ethylene oxide under a comparatively low temperature, approximately 120° C. in absence of water to give a product which is clearly water-soluble and which has an average molecular weight approximately equivalent to that of the products obtained in experiments A, B and C, provided there was complete chemical combination. The acid value of oxyethylated derivative was approximately 2.

In examining experiments A, B and C, it is to be noted that it was impossible to reduce the acid value in any one of the three cases to that obtainable by oxyethylation, to wit, a value of 2. Actually, the values range from approximately 8 to 14. Furthermore, the theoretical amount of ester is subjected to oxyethylation, or whether it is subjected to an esterification with a polyglycol, in an effort to obtain substantially the same product; although, for the sake of brevity, reference is made only to products obtained by phthalation, actually other experiments conducted with other polycarboxy acids, particularly succinic acid, adipic acid, diglycollic acid, etc., indicate that results are substantially the same.

The difference in the nature of the products obtained by the two different procedures, is illustrated further by their effect upon emulsions. The following table shows results obtained by adding an equal amount of the same four materials to certain emulsions. One demulsifying agent consists of the product described under the heading "Water-soluble oxyethylated triricinolein acidic fractional ester, Example 1." The other three consist of the clear oils obtained as resultants from experiments A, B and C, described previously, in tabular form. Here again, it is to be noted that, although the results indicated are concerned with merely one particular derivative, i. e., phthalic acid derivatives, the results are the same, as far as demulsification when other polycarboxy acid derivatives are examined the same way. This is particularly true of adipic acid, succinic acid, diglycollic acid, etc.

It may be desirable to point out that distillable polyglycols of the kind previously referred to and exemplified by nonaethyleneglycol or the like, and particularly those having 8 to 12 oxyalkylated groups, are sometimes referred to as "upper distillable ethyleneglycols." (See U. S. Patent No. 2,324,489, dated July 20, 1943, to De Groote and Keiser.)

Although it has been old to subject emulsions to emulsifying agents obtained by reaction between certain resinous products and polyhydric alcohols free from repetitious ether linkages, yet, as far as we are aware, products of the kind exemplified by experiments A, B and C have not been hereto prepared or employed as demulsifying agents.

DEMULSIFYING TEST NO. 1

| | |
|---|---|
| Date of test | Oct. 30, 1945 |
| State of | California |
| Oil field | Oak Canyon |
| Oil company | V. B. Wickham |
| Lease | No. 4 |
| Well No. | 4 |
| Percent emulsion in fluid from well | 51.0 |
| Percent free water in fluid from well | Trace |
| Percent water obtained by complete demulsification | 46 |
| Percent demulsifier in test solution | 2½ |
| Temperature of tests | 140° C. |
| Period of agitation after adding demulsifier | 5 min. |
| Nature of agitation; machine with shaker arm; shakes per minute | 130 |
| Ratio of demulsifier to well fluid | 1:6700 |

| | L-24142 | L-24143 | L-24144 | L-12866 | Blank |
|---|---|---|---|---|---|
| Time Test started, 2:45 cc. Water out at— | | | | | |
| 3:10 (10-31) | 35— | 8— | 26— | 41 | Trace. |
| 5:00 (10-31) | 38— | 26— | 33— | 42 | Do. |
| 8:15 (10-31) | 40— | 30— | 37— | 43 | Do. |
| 8:50 (11-1) | 40— | 31— | 38 | 44 | Do. |
| 9:15 (11-2) | 42— | 32— | 40 | 44 | Do. |
| 9:15 (11-3) | 42— | 34— | 41 | 44 | Do. |

DEMULSIFYING TEST NO. 2

| | |
|---|---|
| Date of test | Dec. 13, 1945 |
| State of | California |
| Oil field | Wilmington |
| Oil company | Royalty Service |
| Lease | Santa Fe |
| Well No. | B-2 |
| Percent emulsion in fluid from well | 21.0 |
| Percent free water in fluid from well | Trace |
| Percent water obtained by complete demulsification | 18.0 |
| Percent demulsifier in test solution | 2½ |
| Temperature of tests | 160° C. |
| Period of agitation after adding demulsifier | 5 min. |
| Nature of agitation; machine with shaker arm; shakes per minute | 130 |
| Ratio of demulsifier to well fluid | 1:5000 |

| | L-24142 | L-24143 | L-24144 | L-12866 | Blank |
|---|---|---|---|---|---|
| Time Test Started, 10:50 cc. Water out at— | | | | | |
| 1:25 (12-13) | | | | 2 | Trace. |
| 2:45 | | | 1 | 8 | Do. |
| 5:00 | Trace | Trace | 1 | 11 | Do. |
| 8:35 (12-14) | 3 | 2 | 4 | 14 | Do. |
| 4:30 | 5 | 3 | 4 | 14 | Do. |
| 8:05 (12-15) | 5 | 4 | 6 | 14 | Do. |
| 9:10 (12-7) | 9 | 8 | 7 | 15 | Do. |

DEMULSIFYING TEST NO. 3

| | |
|---|---|
| Date of test | Dec. 13, 1945 |
| State of | California |
| Oil field | Wilmington |
| Oil company | Royalty Service |
| Lease | Santa Fe |
| Well No. | B-1 |
| Percent emulsion in fluid from well | 24.0 |
| Percent free water in fluid from well | 0.3 |
| Percent water obtained by complete demulsification | 22.0 |
| Percent demulsifier in test solution | 2½ |
| Temperature of tests | 160° C. |
| Period of agitation after adding demulsifier | 5 min. |
| Nature of agitation; machine with shaker arm; shakes per minute | 130 |
| Ratio of demulsifier to well fluid | 1:5000 |

| | L-24142 | L-24143 | L-24144 | L-12866 | Blank |
|---|---|---|---|---|---|
| Time Test Started, 10:50 cc. Water out at— | | | | | |
| 1:25 (12-13) | Trace | Trace | Trace | 8 | Trace. |
| 2:45 | .2 | Trace | Trace | 13 | Do. |
| 5:00 | .3 | 1 | Trace | 14 | Do. |
| 8:35 (12-14) | 6 | 2 | 3 | 15 | Do. |
| 4:50 | 7 | 3 | 4 | 17 | Do. |
| 8:05 (12-15) | 7 | 2 | 5 | 17 | Do. |
| 9:10 (12-17) | 11 | 3 | 8 | 19 | Do. |

It is of considerable interest to compare compounds of the kind herein described with somewhat analogous compounds described elsewhere in the literature or prepared from data appearing elsewhere. The reagents employed, for example, ricinoleic acid, glycerol, ethylene oxide, phthalic anhydride, etc., can be considered as building blocks or structural units which can be fitted together to give various compounds. Castor oil (triricinolein) may be considered as ricinoleic acid and glycerol in combination.

Some such other structures may be exemplified by examples which appear in the series of U. S. Patents Nos. 2,295,163 through 2,295,170, incluated acid ester, alcoholysis can and usually does take place, particularly at elevated temperatures. This is not true in the case of ethylene oxide.

| Identifying Number of Compound | Reactants and how made | Per cent of Ricinoleyl radical (RCO) in final product | Per cent phthalyl radical in final product $\left(-\overset{O}{\underset{\|}{C}}-\underset{}{\bigcirc}-\overset{O}{\underset{\|}{C}}-\right)$ | Per cent glycerol residue in final product ($C_3H_5$) | Per cent $C_2H_4O$ radicals in final product |
|---|---|---|---|---|---|
| L–24633 | Castor oil plus 2½ moles phth. anhyd. (135° C.) to give acid ester plus Ethylene Oxide (140° C.). | 33.2 | 12.0 | 1.75 | 51.5 |
| L–24645 | Castor oil plus 2½ moles phth. anhyd. plus polyglycol M. W. 1540 (235° C.). | 32.4 | 11.7 | 1.70 | 53.7 |
| L–24646 | Polyglycol M. W. 1540 .8 mole plus phthalic anhyd. 1.6 mole plus castor oil .8. The polyglycol plus anhyd. heated until acid v. drops to ½ of orig. The castor oil is added and heated again for 2 hrs. at 250° C. | 31.2 | 13.1 | 1.64 | 52.8 |
| L–24650 | Castor oil plus 2½ moles phth. anhyd. (135° C.) plus polyglycol 770. | 31.4 | 11.3 | 1.65 | 53.1 | sive, all dated September 8, 1942, to De Groote and Keiser. Briefly stated, a polyglycol acid ester such as nonaethyleneglycol dihydrogen dimaleate, or dihydrogen diphthalate, obtained by reaction between one mole of nonaethyleneglycol and two moles of an appropriate dicarboxy acid or anhydride, is reacted with various hydroxylated compounds, including triricinolein, diricinolein, monoricinolein, etc.

The following table briefly describes four such compounds, the first being an ethylene oxide compound of the kind herein specified. In the next three compounds, or products, an ethylene polyglycol is used instead of ethylene oxide. The compounds were prepared in an effort to have the ultimate composition of the last three compounds approximate with, or identical to, that of the first compound, in terms of structural units.

Needless to say, as has been pointed out already, such resemblance is only superficial for the reason that, depending on the temperature of reaction, order in which reactants are added, and the very nature of the possible reactions themselves, one does obtain products which are inherently and intrinsically different in molecular structure, size of molecule, etc.

It is well to recall that the use of compounds of the kind herein described for the purposes involving surface activity, particularly demulsification, does not involve chemical reactivity in the ordinary sense. Surface activity, and particularly surface activity phenomena as exemplified by demulsification, is concerned with the actual shapes and sizes of molecules. Such concept, even though obscure and difficult to define, acquires a large degree of reality and value in an invention of the kind herein specified even though it is difficult to set forth such qualities in measures which are more concise and specific than those which have been included.

Only a few examples need be repeated at this point to emphasize these differences which, in our opinion, are related to the sizes, shapes, and association of molecules, and especially at interfaces. If phthalated castor oil is reacted with ethylene oxide, one builds up a derivative of the type in which there is always a residual hydroxyl for the reason that ethylene oxide acts like a monofunctional reactant. If one substitutes a glycol for ethylene oxide, then one is employing a difunctional reactant, and one mole of a glycol can act as a coupling reagent to unit two moles of phthalated castor oil. Likewise, with the glycol and a glyceride, or any ester including a phthal- In examining the above table it will be noted all radicals shown do not add to quite 100%. The reason is that some connective oxygen atoms are not included, particularly those attached to glycerol and that, in some instances, there may have been elimination of water which affected the final percentage.

Attention is directed to the fact again that L–24633 typifies one of the compounds described herein. In L–24645 the same intermediate (phthalated castor oil) was reacted with a polyethlyeneglycol having a molecular weight of 1540, so as to give a compound which is analogous as far as its structural parts are concerned, as in the case of L–24633. In L–24646 the polyglycol was first combined with a phthalic anhydride and reacted with a castor oil in a manner described in the series of patents previously referred to, to wit, U. S. Patents Nos. 2,295,163 through 2,295,170. In compound L–24650 the procedure was substantially the same as in L–24645, to wit, the intermediate was the same as in L–24633 (phthalated castor oil), but instead of using a mole of a polyethyleneglycol having a molecular weight of 1540, there was used instead two moles of polyethyleneglycol having a molecular weight of 770.

In addition to the four compounds above described, i. e., one derived by the use of ethylene oxide and the others by the use of a polyethyleneglycol, it is obvious that other compounds could be made, including the use of alkoxy polyethyleneglycol. For instance, one could introduce a residue from a monohydric alcohol, such as methyl alcohol, ethyl alcohol, or propyl alcohol, etc., into a glycol. Such alkyl radical is introduced rather easily by simply substituting the monohydric alkyl ether of a glycol for the dihydric glycol. A suitable compound could be obtained by treating methyl or ethyl alcohol with ethylene oxide so as to give an ether glycol having a single hydroxyl and a molecular weight comparable to the molecular weight of the glycol previously described, that is, 770 and 1540.

However, removing a terminal hydroxyl radical prevents association and produces all sorts of changes which differentiate derivatives of alkoxy polyethyleneglycols from the corresponding derivatives of the polyethyleneglycols themselves. This is illustrated by noting the comparative wetting efficiencies (which properly in turn are related to surface activity) in the case of some of the simpler polyglycol fatty acids and a selected alkoxy derivative.

| Wetting Agent | Concentration (g. per 100 c. c.) for 25 sec. wetting at 25° C. |
|---|---|
| Methoxy polyethyleneglycol M. W. 550 laurate | .066 |
| Polyethyleneglycol M. W. 1,000 dilaurate | .140 |
| Polyethyleneglycol M. W. 400 monolaurate | .160 |
| Polyethyleneglycol M. W. 400 dilaurate | .220 |
| Polyethyleneglycol M. W. 400 mono-oleate | 1.550 |
| Polyethyleneglycol M. W. 600 mono-oleate | 2.250 |

As to compounds or mixtures involving the use of alkoxy polyethyleneglycol plus castor oil and a dicarboxy acid, see U. S. Patent No. 2,081,266, dated May 25, 1937, to Bruson. Compounds of this type, when compared with L—24633, do not show nearly the comparative effectiveness as a demulsifier, or for other purposes, such as use as a break inducer in the treatment of sour hydrocarbons.

The above compounds were then tested for demulsification on a number of typical emulsions. Some of the tests are as follows:

DEMULSIFYING TEST NO. 4

| | |
|---|---|
| Date of test | April 2, 1948 |
| State of | California |
| Oil field | Montebello |
| Oil company | Century |
| Lease | Repetto |
| Well | No. 15 |
| Per cent emulsion in fluid from well | 59 |
| Per cent water in fluid from well | 3 |
| Per cent water obtained by complete demulsification | 44 |
| Per cent demulsifier in test solution | 2.5% |
| Temperature of tests | 90° F. |
| Period of agitation after adding demuls | 5 min. |
| Nature of agitation; machine with shaker arm; shakes per minute | 130 |
| Ratio of demulsifier to well fluid | 1:13,000 |
| | 1:26,000 (see below) |

DEMULSIFYING TEST NO. 5

| | |
|---|---|
| Date of test | April 2, 1948 |
| State of | California |
| Oil field | Signal Hill |
| Oil company | D. L. Brown |
| Lease | #1 |
| Well | #1 |
| Per cent emulsion in fluid from well | 36 |
| Per cent free water in fluid from well | 16 |
| Per cent water obtained by complete demulsification | 46 |
| Per cent demulsifier in test solution | 2.5% |
| Temperature of tests | 90° F. |
| Period of agitation after adding demuls | 5 min. |
| Nature of agitation; machine with shaker arm; shakes per minute | 130 |
| Ratio of demulsifier to well fluid | 1:13,000 |
| | 1:26,000 (see below) |

| | L–24633 | L–24645 | L–24646 | L–24656 | |
|---|---|---|---|---|---|
| Per Cent Demulsifier | 1/26,000 | 1/13,000 | 1/13,000 | 1/13,000 | Blank |
| Time test started, 1:20 cc. water out at— | | | | | |
| 2:00 (4/2) | .8 | .9 | .7 | .7 | Trace. |
| 3:40 (4/2) | 22 | 24 | 22 | 22 | Do. |
| 4:40 (4/2) | 26 | 27 | 26 | 26 | Do. |
| 12:40 (4/2) | 31 | 28 | 28 | 30 | Do. |
| 10:50 (4/3) | 31 | 28 | 28 | 30 | Do. |
| 11:00 (4/4) | 32 | 31 | 31 | 31 | Do. |

DEMULSIFYIING TEST NO. 6

| | |
|---|---|
| Date of test | Apr. 2, 1948 |
| State of | California |
| Oil field | Seal Beach |
| Oil company | Hellman Estates |
| Lease | 3A |
| Well | 3A |
| Per cent emulsion in fluid from well | 20 |
| Per cent free water in fluid from well | 6 |
| Per cent water obtained by complete demulsification | 16 |
| Per cent demulsifier in test solution | 2.5% |
| Temperature of tests | 110° F. |
| Period of agitation after adding demuls | 5 min. |
| Nature of agitation; machine with shaker arm; shakes per minute | 130 |
| Ratio of demulsifier to well fluid | 1:10,000 |
| | 1:20,000 (next page) |

| | L–24633 | L–24633 | L–24645 | L–24646 | L–24050 | |
|---|---|---|---|---|---|---|
| Percent Demulsifier | 1/13,000 | 1/26,000 | 1/13,000 | 1/13,000 | 1/13,000 | Blank |
| Time test started, 10:20 cc. water out at— | | | | | | |
| 10:40 (4/2) | 8 | 4 | 3 | 5 | 5 | Trace. |
| 10:50 (4/2) | 25 | 12 | 6 | 8 | 9 | Do. |
| 11:00 (4/2) | 35 | 20 | 12 | 15 | 17 | Do. |
| 11:30 (4/2) | 40 | 25 | 25 | 28 | 27 | Do. |

|  | L-24633 | L-24645 | L-24646 | L-24650 |  |
|---|---|---|---|---|---|
| Percent Demulsifier | 1/20,000 | 1/10,000 | 1/10,000 | 1/10,000 | Blank |
| Time test started, 10:20 cc. water out at— |  |  |  |  |  |
| 1:20 (4/2) | 10 | 10 | 8 | 8 | Trace. |
| 4:45 (4/2) | 12 | 11 | 10 | 11 | Do. |
| 12:35 (4/2) | 13 | 11 | 11 | 12 | Do. |
| 10:40 (4/3) | 13 | 12 | 11 | 12 | Do. |
| 10:55 (4/4) | 15 | 13 | 13 | 13 | Do. |

In addition to the foregoing demulsifying tests, the same four compounds identified as L-24633, L-24645, L-24646 and L-24650, have been tested on other emulsions with comparable differences. For sake of brevity these other tests are omitted but they include, among others, a test on an oil from Well No. 16, Cueller Lease of Cox and Hammond, in the Hoffman Pool, Alice, Texas; the Stanolind Oil & Gas Company composite sample from the battery from a lease located in the Wink Field near Kermit, Texas, etc.

These series of tests reveal that the compound obtained by the use of ethylene oxide was 35% to 65% better in numerous instances, and not infrequently was 100% better.

What has been said previously in regard to the structure of compounds which appear to be analogous at first superficial examination, should be reconsidered in light of the previous description of L-24633, L-24645, L-24646 and L-24650, together with the foregoing tests. The same sorts of differences would be shown in other comparable tests where surface activity is concerned with the industrial application, as for instance, break induction in doctor treatment of sour hydrocarbons. The fact that there is a similarity, in fact, almost an identity of structure when measured in terms of acid radicals, ethylene oxide radicals, etc., does not mean that the size of molecules is the same for the obvious reason that the same materials of construction yield architecturally different products.

Conventional demulsifying agents employed in the treatment of oil field emulsions are used as such, or after dilution with any suitable solvent, such as water; petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, and sulfur dioxide extract obtained in the refining of petroleum, etc., may be employed as diluents. Similarly, the material or materials employed as the demulsifying agent of our process may be admixed with one or more of the solvents, customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form which exhibits both oil and water-solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at somewhat lower cost than is possible with other available demulsifiers, or conventional mixtures thereof. It is believed that the particular demulsifying agent or treating agent herein described will find comparatively limited application, as far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

One preferred and more narrow aspect of our invention, insofar as its is concerned with demulsification of petroleum emulsions of the water-in-oil type, is concerned with the admixture of the ester, as described, with a viscosity-reducing solvent, such as the various solvents enumerated, particularly aromatic solvents, alcohols, either alcohols, etc., as previously specified. The word "solvent" is used in this sense to refer to the mixture, if more than one solvent is employed, and generally speaking, it is our preference to employ the demulsifier in a form representing 25% to 85% demulsifier and 15% to 75% solvent, largely, if not entirely non-aqueous, and so selected as to give a solution or mixture particularly adaptable for proportional pumps or other measuring devices. The following examples will illustrate this aspect of our invention:

DEMULSIFIER

Example 1

| | Per cent |
|---|---|
| Oxyalkylated water-soluble triricinolein fractional ester, Example 1 | 60 |
| Xylene | 20 |
| Isopropyl alcohol | 20 |

DEMULSIFIER

Example 2

| | Per cent |
|---|---|
| Oxyalkylated water-soluble triricinolein fractional ester, Example 4 | 70 |
| Cresylic acid | 20 |
| Normal butyl alcohol | 10 |

DEMULSIFIER

Example 3

| | Per cent |
|---|---|
| Oxyalkylated water-soluble triricinolein fractional ester, Example 4 | 70 |
| Aromatic petroleum solvent | 10 |
| Isobutyl alcohol | 10 |
| Acetone | 10 |

DEMULSIFIER

Example 4

| | Per cent |
|---|---|
| Oxyalkylated water-soluble triricinolein fractional ester, Example 4 | 65 |
| Methyl alcohol | 15 |
| Dichloroethylether | 20 |

In the hereto appended claims the word "water-miscible" is employed to designate a sol or solution which is permanent for either an indefinite period of time, or for such extended period of time as would unquestionably permit its utilization for the herein designated purposes without undue difficulties.

The products herein described, and employed as demulsifying agents in our process, may be considered as intermediates for further reaction. For example, they may be reacted with chloroacetic acid or similar low molal alpha-halogenated carboxy acid to produce an ester. Such ester will serve many of the purposes herein described, i. e., as a demulsifier, break inducer, etc. Such alpha-halogenated carboxy acid ester may be reacted further, for example, with a tertiary amine, such as dimethyldodecylamine, esterified triethanolamine, in which the acyl radical is derived from a detergent-forming monocarboxy acid, and from hydroxylated amines obtained, for example, by reaction with high molal amines, such as octadecylamine with two moles of ethylene oxide. Such compounds or derivatives again can be employed for all of the various purposes herein indicated, and particularly for demulsification.

The word "miscible" is frequently used to mean soluble in all proportions. In a technical sense it is sometimes employed to mean soluble without necessarily meaning in all proportions, and such solubility may include a colloidal dispersion or sol as well as molecular solution. The word "water-miscible" is employed in the hereto appended claims in this more restricted meaning.

Having thus described our invention, what we claim as new and desire to secure by Letters Patent is:

1. A process for breaking petroleum emulsions of the water-in-oil type, characterized by subjecting the emulsion to the action of a demulsifier including a water-miscible oxyethylated triricinolein acidic ester; said triricinolein acidic ester being that of a saturated dicarboxy acid having not over 10 carbon atoms and characterized by the fact that prior to oxyethylation there is present at least one dicarboxy acid carboxyl radical for each triricinolein, and all dicarboxy acid radicals are directly attached to the ricinoleyl radical, and with the further proviso that the weight of ethylene oxide added by reaction based on the weight of the triricinolein acidic ester prior to oxyethylation is within the range of 75% to 125%.

2. A process for breaking petroleum emulsions of the water-in-oil type, characterized by subjecting the emulsion to the action of a demulsifier including a water-miscible oxyethylated triricinolein acidic ester; said triricinolein acidic ester being that of a saturated dicarboxy acid having not over 10 carbon atoms and characterized by the fact that prior to oxyethylation there is present a plurality of dicarboxy acid carboxyl radicals for each triricinolein radical, and all dicarboxy radicals are directly attached to the ricinoleyl radical; with the further proviso that the weight of ethylene oxide added by reaction based on the weight of the triricinolein acidic ester prior to oxyethylation is within the range of 75% to 125%.

3. A process for breaking petroleum emulsions of the water-in-oil type, characterized by subjecting the emulsion to the action of a demulsifier including a water-miscible triricinolein acidic ester; said triricinolein acidic ester being that of phthalic acid and characterized by the fact that prior to oxyethylation there is present a plurality of phthalic acid radicals for each triricinolein radical, and all phthalic acid ralicals are directly attached to the ricinoleyl radical; with the further proviso that the weight of ethylene oxide added by reaction based on the weight of the triricinolein acidic ester prior to oxyethylation is within the range of 75% to 125%.

4. A process for breaking petroleum emulsions of the water-in-oil type, characterized by subjecting the emulsion to the action of a demulsifier including a water-miscible triricinolein acidic ester; said triricinolein acidic ester being that of adipic acid and characterized by the fact that prior to oxyethylation there is present a plurality of adipic acid radicals for each triricinolein radical, and all adipic acid radicals are directly attached to the ricinoleyl radical; with the further proviso that the weight of ethylene oxide added by reaction based on the weight of the triricinolein acidic ester prior to oxyethylation is within the range of 75% to 125%.

5. A process for breaking petroleum emulsions of the water-in-oil type, characterized by subjecting the emulsion to the action of a demulsifier including a water-miscible triricinolein acid ester; said triricinolein acidic ester being that of a diglycollic acid and characterized by the fact that prior to oxyethylation there is present a plurality of diglycollic acid radicals for each triricinolein radical, and all diglycollic acid radicals are directly attached to the ricinoleyl radical; with the further proviso that the weight of ethylene oxide added by reaction based on the weight of the triricinolein acidic ester prior to oxyethylation is within the range of 75% to 125%.

MELVIN DE GROOTE.
BERNHARD KEISER.

REFERENCES CITED

The following references are of record in the file of this patent:

UNITED STATES PATENTS

| Number | Name | Date |
|---|---|---|
| 2,281,419 | De Groote et al. | Apr. 28, 1942 |
| 2,295,163 | De Groote et al. | Sept. 8, 1942 |
| 2,295,168 | De Groote et al. | Sept. 8, 1942 |
| 2,307,058 | Moeller | Jan. 5, 1943 |
| 2,344,980 | De Groote et al. | Mar. 28, 1944 |
| 2,353,701 | De Groote et al. | July 18, 1944 |
| 2,442,073 | De Groote et al. | May 25, 1948 |